Patented Sept. 28, 1948

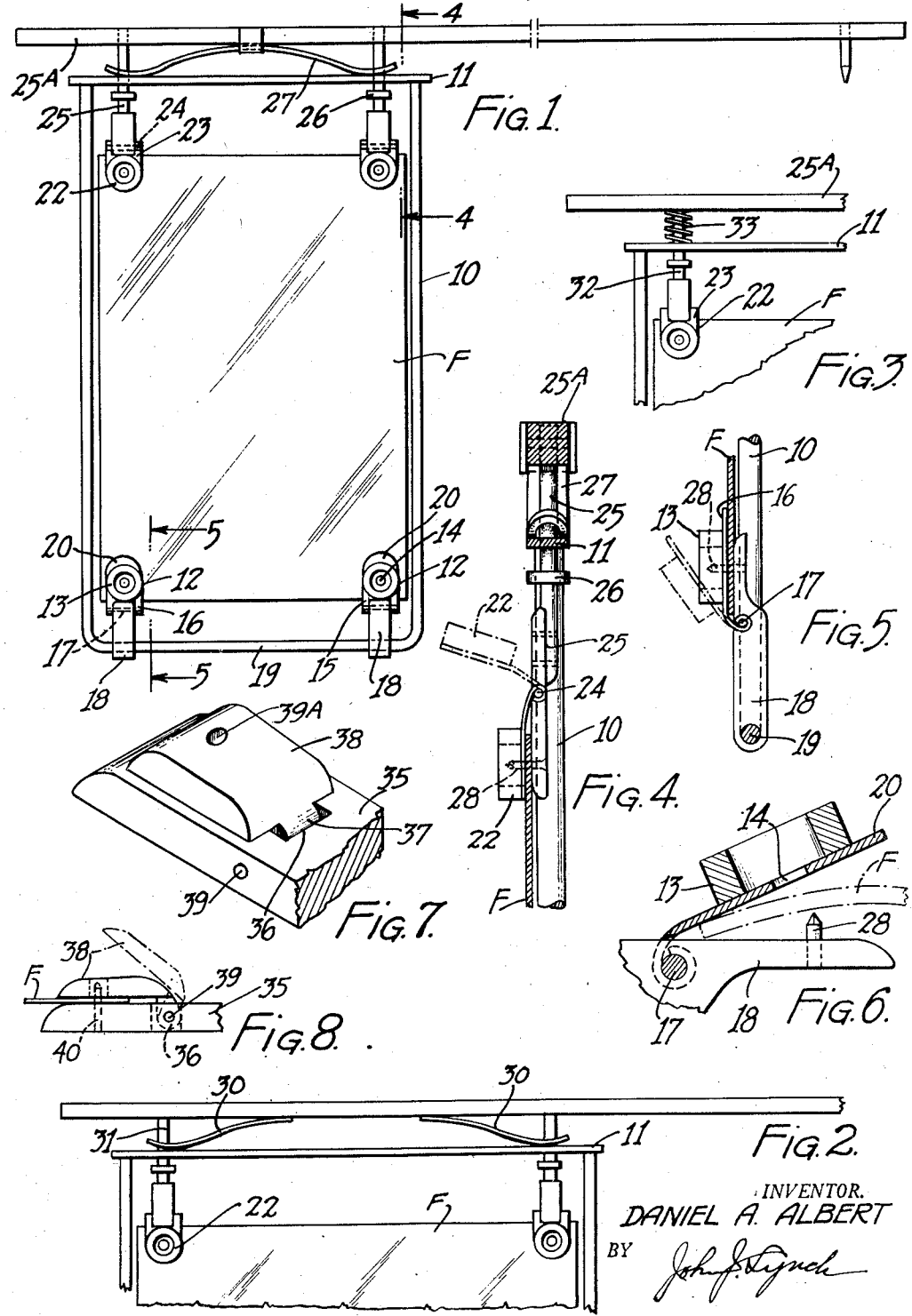

2,450,178

UNITED STATES PATENT OFFICE 2,450,178

FILM TENSIONING HOLDER FOR FLUID PROCESSING

Daniel A. Albert, Richmond Hill, N. Y.

Application November 14, 1946, Serial No. 709,684

2 Claims. (Cl. 95—100)

This invention relates to frames and in particular to those employed in the mounting of films or photographic negative during development, washing or inspection operations.

My invention is directed particularly to a frame that is employed in the handling of X-ray films so that the latter can be supported in a frame in taut condition, without wrinkles or bulges therein and can be developed in the usual solution bath and then hung up on a rack to dry. Also, my novel frame provides a means whereby the developed film may be handled by the laboratory technician or doctor for inspection without the need of handling the film directly.

In the developement of films it is well understood that they are mounted in the frame in a dark room and while frames are employed generally for this purpose, they have objectionable features that make them of doubtful value in the handling of a film in a dark room. In such location the film must be mounted in the frame by the operator feeling the frame and adjusting the film thereto. It is an important object of my invention, therefore, to provide a film holding frame that is so arranged and provided with holding means so that the film can be readily mounted in the frame accurately and quickly by a simple manipulation of the parts and can be removed therefrom with a simple pushing motion applied to the film itself to release it from the frame.

Other objects of the invention are to provide film holding clips at one end of the frame into which the film can be squared in the frame and then affixed to a holding means at the opposite end of the frame which operates to place the film under tension and hold the same taut so that during the process of developing and drying, the film will remain smooth and unwrinkled; to provide a frame of simple construction in which the parts are held by the hand with a normal grip to permit the film to be inserted in the frame and then released to apply the tension; and to provide a frame that is compact and may be employed in large numbers in a developing tank or hanging from a drying rack.

With these and other objects in view, the invention comprises certain constructions hereinafter described and then particularly pointed out in the claims and a preferred embodiment of my invention is illustrated in the accompanying drawing, in which:

Figure 1 is a side view of a film frame constructed in accordance with my invention showing a film in place therein, Figure 2 is a side view of the upper edge of a film frame similar to that shown in Figure 1, illustrating the use of a different type spring used in frames of a larger type, Figure 3 is a fragmentary view of one corner of a frame showing a still further type of spring that may be used, Figure 4 is an enlarged section taken on the line 4—4 of Figure 1 showing the mounting of one of the film holding grippers, Figure 5 is an enlarged section taken on the line 5—5 of Figure 1 showing the gripper used at the lower end of the frame, Figure 6 is a greatly enlarged view in cross section through the gripper illustrated in Figure 5 showing in outline the position taken by the edge of a film placed therein, Figure 7 is a fragmentary view in perspective showing a modified form of gripper that may be used in the frame, and Figure 8 is a side view of the gripper shown in Figure 7.

Referring to the drawing in detail, 10 indicates a U-shaped heavy wire frame closed across the upper end by a cross strip 11 secured to the frame in any suitable manner. The wire is of heavy gauge, but light in weight for ease of handling. The bottom of the frame has secured thereto adjacent the corners of the frame, the bottom clips or grippers 12 which consist of cylindrical bands 13 or rings disposed in concentric relation to an opening 14 each in a tab 15 hinged as by the ears 16 to a hinge or pivot pin 17 passing through an arm 18 that is soldered or otherwise secured to the bottom 19 of the frame. While the tab 15 is of substantially the same width as the diameter of the band it extends therebeyond as at 20 to provide a guide lip to assist in guiding the edge of the film into the space left when the clip is open as at Figure 6.

Each corner of the frame is provided with one film clip and a description of one will suffice. At the upper edge of the frame the clips consist of a band or ring 22 secured to a tab 23 pivoted by the pin 24 to a guide arm 25 passing through the cross strip 11 and attached in any manner to the underside of a carrier bar 25A which is used to mount the frame on the edge of a tank or rack. The arm 25 carries a limiting flange 26 which acts as a detent to limit the movement of the frame away from the bar 25A under influence of the spring 27 that is attached to said bar as by riveting or otherwise and engages at its free ends about the arms 25 and against the cross strip 11. The tab 23 is perforated and each of the arms 18 and 25 are provided with piercing pins 28 disposed concentrically with relation to said rings so that when a film is in place beneath the rings, they can be closed to cause the pins to pierce and hold the film securely at each of its four corners.

Instead of a single strip spring 27 as shown in Figure 1, I may use individual springs 30 for each guide pin or arm 31 as shown in Figure 2, or I may employ on each arm 32 as in Figure 3, a coil spring 33. If desired, the form of clip may be slightly modified as shown in Figures 7 and 8 in which instance, the support arm 35 which carries the clip may be provided with an opening 36 in which the tail 37 of a plate 38 having an opening 39A therein, may be pivoted on a pin 39 passing through said arm 35. A piercing pin 40 on the arm 35 acts to hold the film in place when the latter is pierced by the closing action of the plate 38.

It will be noted that in Figure 4 the outline position of the clip shows it fully open and in Figures 5 and 6, the outline position shows the clip partly open. In the latter, the clip at the lower edge corner of the frame acts as a stop when the film is brought against the clip for squaring in the frame. When the film F is being impaled on the lower clips, the other hand of the operator will thereafter swing the frame around at the same time gripping the bar 25A and strip 11 to pull them toward each other against the resistance of the spring. When the upper edge of the film is impaled on the upper clips of the closing of the latter, the frame is released and by the action of the spring places the film under tension, the bottom of the frame pulling downwardly away from the bar 25A.

It is evident that the clips along the bottom of the frame need no elaborate manipulation in order to attach the film to the frame in the darkness of the dark room and then it is a simple matter for the operator to squeeze the parts of the frame and attach the upper end of the film in place and without further thought place the film in the tank. The bar 25A in addition to providing a mounting means for the frame, also serves as a handle by which the film can be held up to the light for inspection.

My invention is not to be restricted to the precise details of construction shown since various changes and modifications may be made therein without departing from the scope of the invention or sacrificing the advantages to be derived from its use.

What I claim is:

1. A film holder comprising a carrier bar, spaced guide arms extending from one side of the carrier bar, a frame mounted for sliding movement on said arms, film engaging clips on the ends of said arms within one end of said frame, clips on the other end of the frame and a spring means intermediate the carrier bar and the frame for urging the latter away from the bar to place a film held in said clips under tension.

2. A film holder comprising a carrier bar, guide arms extending therefrom, a rectangular frame movably mounted on said arms, means for urging the frame away from the bar, clips on said arms and said frame for mounting a film therebetween, and means on said arms for limiting the movement of the frame in a direction away from the bar.

DANIEL A. ALBERT.

REFERENCES CITED

The following references are of record in the file of this patent:

UNITED STATES PATENTS

| Number | Name | Date |
| --- | --- | --- |
| 1,854,931 | Gollomb | Apr. 19, 1932 |
| 2,078,078 | Hood | Apr. 20, 1937 |